(No Model.)
W. H. KNOWLES.
LAND ROLLER.
No. 325,749. Patented Sept. 8, 1885.
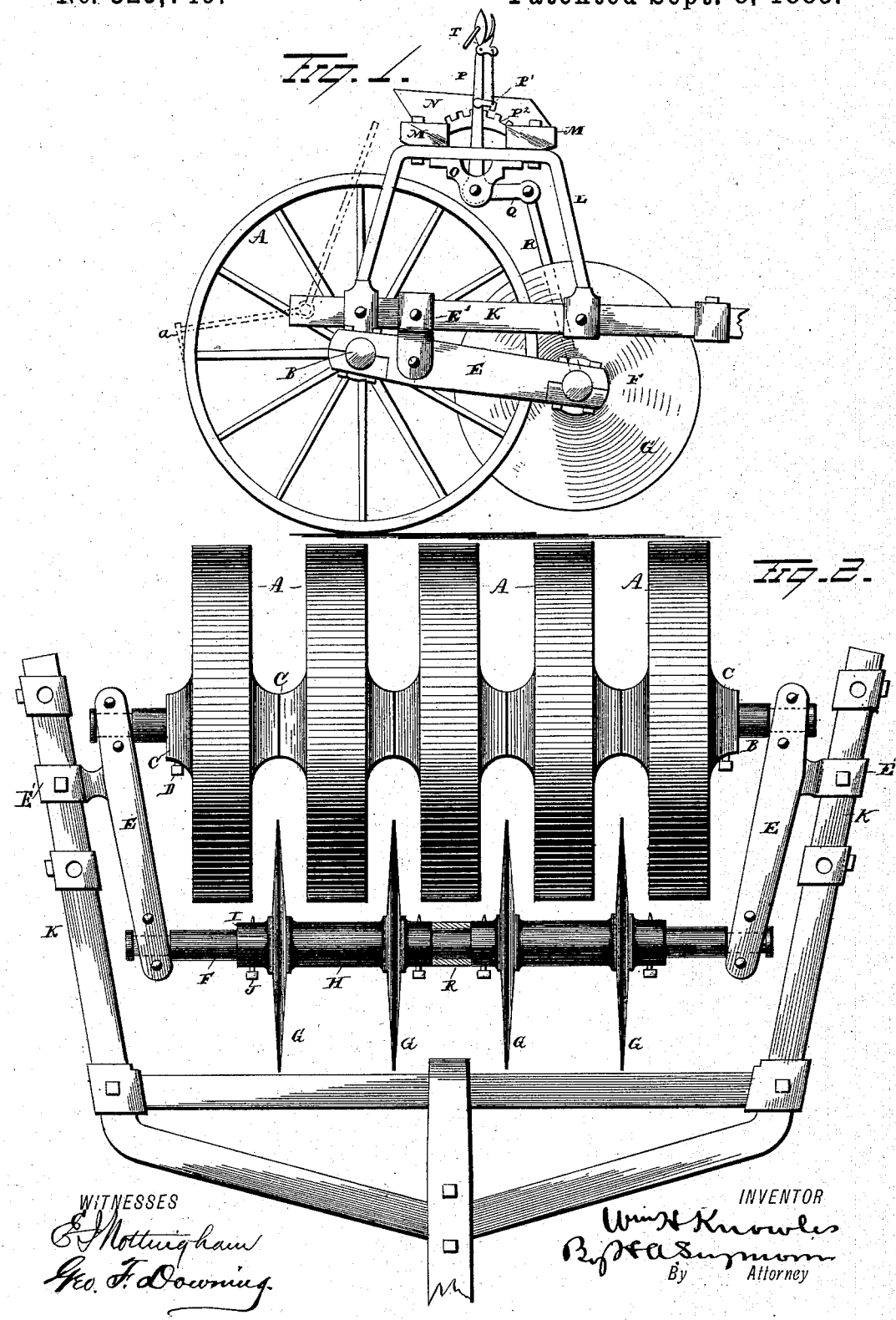
WITNESSES
E. Nottingham
Geo. F. Downing
INVENTOR
Wm H Knowles
By H A Simpson
Attorney

UNITED STATES PATENT OFFICE.

WILLIAM H. KNOWLES, OF BELLMONT, ILLINOIS.

LAND-ROLLER.

SPECIFICATION forming part of Letters Patent No. 325,749, dated September 8, 1885.

Application filed February 19, 1885. (No model.)

*To all whom it may concern:*

Be it known that I, WILLIAM H. KNOWLES, of Bellmont, in the county of Wabash and State of Illinois, have invented certain new and useful Improvements in Land-Rollers; and I do hereby declare the following to be a full, clear, and exact description of the invention, such as will enable others skilled in the art to which it appertains to make and use the same.

My invention relates to an improvement in land-rollers, the object of the same being to provide a machine of this character by means of which sod and soil may be cut and broken simultaneously. A further object is to provide a machine of the above character with adjustable cutters, whereby the rollers may be employed separately from the cutters or in conjunction therewith, as preference or necessity may dictate. A further object is to provide a machine which shall be simple and economical in construction and durable and efficient in use; and with these ends in view my invention consists in certain features of construction and combinations of parts, as will be hereinafter fully described, and pointed out in the claims.

In the accompanying drawings, Figure 1 is a side view of my invention, and Fig. 2 is a plan view of the same with the seat-frame removed.

A represents the land wheels or rollers, mounted on the axle B, to which they are suitably secured against endwise movement by means of the collars C, located near the ends of the axle, the said collars being held in position by means of set-screws D. The hubs of the wheels should be of sufficient length to separate the rims of the wheels a proper distance. The axle B is preferably made of a hollow tube—such as gas-pipe—and the same is provided on its ends with suitable spindles, preferably inserted and secured therein, whereby the spindles, when worn, can be replaced at a small expense without removing the axle.

E are rock-arms pivotally secured near their rear ends to bearings depending from the main frame K, and provided at their rear ends with bearings for the spindles of the axle B, and at their front ends with bearings for the spindles of the axle F. This axle F is provided with cutting-disks G, journaled thereon at points between the wheels A, and are retained in proper position by collars H, placed between said disks. The disks are secured against endwise movement on the axle by means of the collars I at each end, the said collars being fastened by means of the set screws or pins J.

To the top of the frame K are suitably secured the uprights and cross pieces L, made of any desired material. The cross-pieces are connected by means of the strips M, which are suitably secured thereto. To the top of the strips M is secured the seat N, which is adjustably attached thereto in such manner as will permit the same to be moved back and forth as desired. Thus the weight of the driver may be transferred from one portion of the machine to the other. To the bottom of the strips M is secured the depending arm O on one side of the seat, to which arm is pivotally secured the operating-lever P, which is suitably held in rotary adjustment by means of the spring-actuated dog P', which registers with the sector-bar $P^2$, attached to the strips M, the said lever being provided with the lateral arm Q, to the end of which is pivoted the arm R, which is suitably attached to the axle F, preferably about the center. It will be seen that when it is desired to elevate the cutters the lever P is thrown backward, and is held in desired adjustment by means of the spring-actuated dog P'.

When the machine is to be used upon hard and uneven ground, it is desirable that the cutters should not be locked in any positive adjustment. Consequently the handle of the lever P is provided with the loop T, which is adapted to be forced over the handle of the dog, thereby holding the dog out of contact with sector-bar $P^2$, thus allowing the cutters to freely rise and pass over obstacles when in contact with hard substances which would be likely to injure them.

The advantages of my machine over others are numerous. For instance, the adjustability of the seat permits the machine to be balanced by the weight of the driver, thus relieving the necks of the horses of all superfluous weight. Again, by employing the lever in connection with the cutters the cutter-wheels may be employed simultaneously; or, if preferred, the wheels alone may be employed.

When the machine is used upon fields of growing corn, cotton, &c., one or more of the wheels should be removed from the axle and adjustable collars placed between them, thus leaving a sufficient space between the rims of the wheels to pass between the rows.

If desired, the rear end of the frame may be provided with the scraper $a$, which can be hinged or pivoted thereto and provided with suitable locking mechanism, whereby the same can be kept from contact with the rim of the rollers and brought into contact therewith, whereby the dirt which generally accumulates thereon can be displaced.

As it is evident that many slight changes in the construction and relative arrangement of parts might be resorted to without departing from the spirit of my invention, I would have it understood that I do not restrict or limit myself to the exact construction and arrangement of parts shown and described.

Having fully described my invention, what I claim as new, and desire to secure by Letters Patent, is—

1. The combination, with a main frame, a sector-bar secured thereto, and a swinging frame, the latter consisting, essentially, of two rock-arms pivoted to said main frame, and land-rollers and cutters supported by the rock-arms, of a lever pivoted to the main frame and connected to the swinging frame, and devices for locking the lever to the sector-bar, substantially as set forth.

2. The combination, with a main frame and a swinging frame, consisting, essentially, of two rock-arms pivoted to the main frame, of axles journaled in the ends of the rock-arms, cutters and rollers mounted on said axles, a sector-bar secured to the main frame, a lever pivoted to the main frame and connected to the swinging frame, and a spring-actuated dog for locking the lever, substantially as set forth.

3. The combination, with a main frame and a swinging frame carrying cutters, and a land-roller, the latter located behind the cutters, of a seat adjustably secured to the main frame and adapted to be moved back and forth, as described.

In testimony whereof I have signed this specification in the presence of two subscribing witnesses.

WILLIAM H. KNOWLES.

Witnesses:
  T. C. JOACHIMS,
  J. H. TANQUARY.